Aug. 18, 1959   R. M. KROKOS ET AL   2,899,842
BICYCLE PEDAL
Filed March 9, 1956
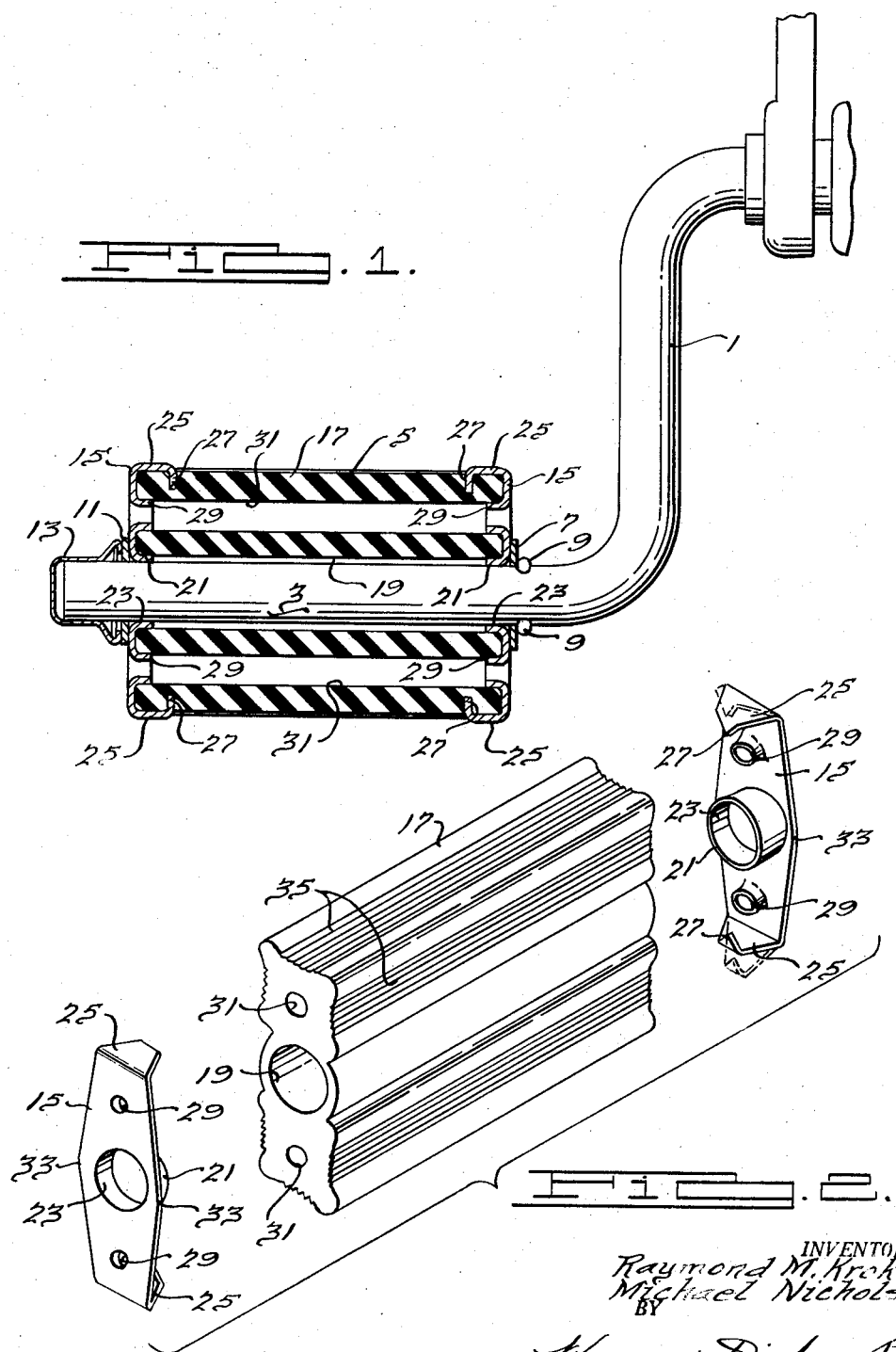
INVENTORS.
Raymond M. Krokos,
Michael Nichols, Jr.
BY
Harness, Dickey & Pierce
ATTORNEYS.

ated Aug. 18, 1959

2,899,842
BICYCLE PEDAL

Raymond M. Krokos and Michael Nichols, Jr., Detroit, Mich., assignors to Evans Products Company, Plymouth, Mich., a corporation of Delaware Application March 9, 1956, Serial No. 570,485

9 Claims. (Cl. 74—594.4)

Our invention relates to pedals for bicycles, tricycles, and similar devices which are actuated by the feet of an operator.

It is an object of this invention to materially simplify pedal constructions and to substantially reduce their cost of manufacture.

Another object is to improve the appearance of pedals.

Relatively few improvements have been made for a period of many years in pedal constructions. The conventional pedal design is well known since it is used on practically all bicycles, tricycles, and children's foot operated toys. It contains several parts including two rubber bodies, two end plates, two bolt and nut assemblies, and a crank arm bearing and housing. In contrast, the pedal of the present invention comprises only three parts, viz., two end plates and a central rubber body. The end plates contain portions that are embedded in the rubber body to form a unitary three piece assembly. The bearing surfaces for the crank arm are preferably provided in the end plates as are suitable means to prevent relative movement of the end plates and the rubber body and to assist in properly locking the end plates and rubber together.

The drawings show a preferred form of the invention in which:

Figure 1 is a side elevation with parts broken away and in section of the present pedal construction mounted upon the crank arm of a tricycle; and Figure 2 is an exploded perspective view of the improved pedal construction.

In the drawings the tricycle crank arm 1 is typical of various members on which a pedal may be mounted. It has a transverse arm 3 on which is rotatably mounted the improved pedal 5. The pedal 5 is held in proper axial position on the arm 3 by a washer 7 that shoulders against swaged ears 9 formed on the crank arm 3 and by a washer 11 held in place by a cap clench type fastener 13 fitting over the end of the arm 3. These parts are conventional and other means for holding the pedal 5 in position on the arm 3 may be used if desired.

The improved pedal 5 comprises opposite pressed metal end plates 15 which are preferably of identical construction and an extruded rubber pedal body 17 located between the end plates. The rubber body 17 has a central aperture 19 extending through it and fitting in the ends of this aperture are annular flanges 21 formed in the central portions of the end plates. The flanges 21 have interior surfaces 23 which act as bearing surfaces in rotatable engagement with the arm 3 of the crank 1 which extends through the aperture 19 when the pedal is mounted in position as shown in Figure 1. While the annular surfaces 23 are preferably used as bearing surfaces it will be understood that it is within the scope of our invention to mount bearing sets, containing rolling elements such as balls or rollers, in the flanges 21 to provide a substantially non-friction support for the pedal on the arm 3.

The end plates 15 have side arm portions 25 including pointed turned in end portions or prongs 27. The width of the end plates 15 between the arms 25 corresponds to the width of the pedal but prior to assembly the arms 25 will preferably make an angle of somewhat more than 90° (see dotted line position of Fig. 2) so that the distance between the points of the prongs 27 is slightly wider than the body of the pedal. In assembly the end plates 15 are brought into engagement with the end faces of the rubber body 17 so that flanges 21 extend into aperture 19 as far as possible. The arms 25 are then bent inwardly causing the prongs 27 to be embedded in the sides of the rubber body 17, firmly holding the end plates to the rubber body against relative movement. Additionally, embossments 29 on opposite sides of the central flange 21 may be pressed in the end plates 15 and these are received in recesses located in the end faces of the rubber body and provided by apertures 31 extending through the body. The seating of embossments 29 in the recesses 31 act to connect the end plates and the rubber together in a force transmitting engagement that assists in preventing relative rotational movement of the end plates and the rubber body about the axis of the arm 3. It also acts to properly pre-position the end plates and rubber.

The particular shape of the end plates 15 may, of course, vary but it is preferred to make it of greatest width at the center portion so that the sides 33 will at that point extend slightly above and below the central surfaces of the rubber body 17, thus acting to ensconce the foot in place on the pedal. The particular shape of the rubber body 17 may also be varied but it is preferably provided with serrations or ridges 35 to help prevent slippage of the feet on the pedal.

It will be seen that the invention provides a simple and inexpensively manufactured pedal of attractive appearance and it will be understood that variations of the specific structure shown may be made without departing from the spirit and scope of the invention.

We claim:

1. A three piece pedal consisting of a pedal body having an opening extending therethrough, a pair of opposite end plates clamped to said body, the end plates having openings aligned with said through opening in the body and the edges of the plate openings serving as bearing surfaces for rotatably mounting the pedal on a member adapted to extend through said through opening, said bearing surfaces providing the means for rotatably supporting said pedal on the member.

2. A pedal comprising a one piece pedal body with a crank aperture extending through it, and a pair of end plates in gripping engagement with the ends of the pedal body and having flanged apertures aligned with the body aperture and providing bearings for a crank arm adapted to extend through said crank aperture, said end plates providing the means for rotatably supporting said pedal on the crank arm.

3. In a pedal construction, a foot engaging member, a pair of end plates clamped on to opposite ends of said member, and interfitting embossments and recesses on said member and said end plates preventing relative rotational movement between them, said member having a crank aperture extending therethrough and each of said end plates having openings therein aligned with said crank aperture, the edges of said openings serving as bearings for rotatably mounting the pedal on a crank arm adapted to extend through said crank aperture.

4. In a pedal construction, a rubber pedal body, a pair of end plates engaging the end faces of said body and having turned over ears embedded in the sides of said body to secure said plates thereto, and integral means on said plates for rotatably mounting the body on a driving member.

5. In a pedal construction, a rubber body having a central aperture extending therethrough, a pair of end plates having turned over portions embedded in the sides of said body and having integral means aligned with opposite ends of said aperture providing bearings for rotatably mounting the pedal on a drive member adapted to extend through said aperture.

6. The invention set forth in claim 5 wherein said means comprises annular flanges on said plates and fitted in the ends of said aperture.

7. In a pedal construction, a pedal body having a central aperture therethrough to receive a driving member, a pair of end plates for the body, means securing the end plates to the body, said plates having openings therein aligned with the aperture, means forming recesses in each end of the body on opposite sides of said aperture, and embossments on the end plates fitting into each of said recesses, the edges of said plate openings providing means for rotatably mounting the pedal on a crank arm adapted to extend through said central aperture.

8. The invention set forth in claim 7 wherein said means for securing the plates to the body comprises turned over prongs on opposite ends of each plate embedded in the sides of the body.

9. The invention set forth in claim 8 wherein said recess forming means comprises a pair of apertures extending through said body, said body comprising a rubber extrusion.

References Cited in the file of this patent

UNITED STATES PATENTS

| | | |
|---|---|---|
| 402,926 | Haynes | May 7, 1889 |
| 473,030 | Sweetland | Apr. 19, 1892 |
| 1,425,214 | Persons | Aug. 8, 1922 |
| 1,788,041 | Balfe | Jan. 6, 1931 |
| 2,084,373 | Anderson | June 22, 1937 |
| 2,567,785 | Rieger | Sept. 11, 1951 |
| 2,568,443 | Gerner | Sept. 18, 1951 |

FOREIGN PATENTS

| | | |
|---|---|---|
| 9,063 | Great Britain | July 28, 1885 |
| 862,054 | France | Nov. 22, 1940 |